Sept. 11, 1945.   O. HAMMER   2,384,675
APPARATUS FOR MULTIPLE STAGE CEMENTING
Filed Sept. 28, 1942   2 Sheets-Sheet 1
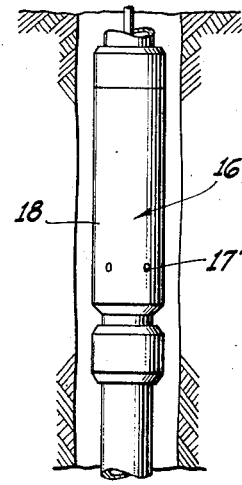
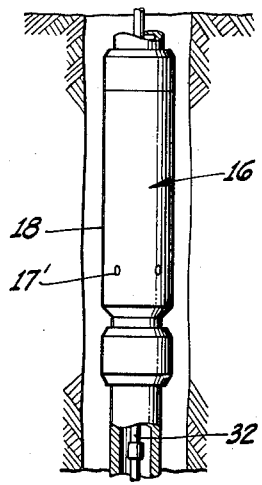
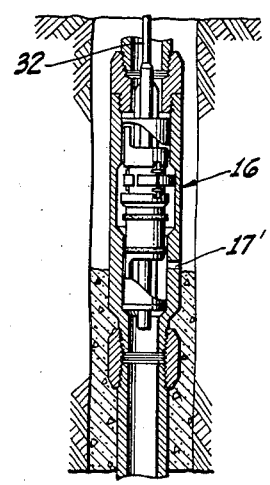
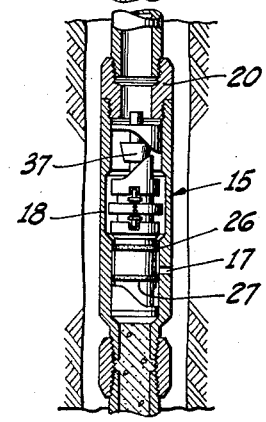
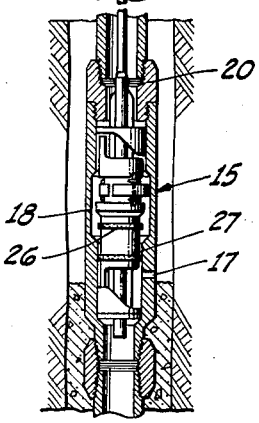
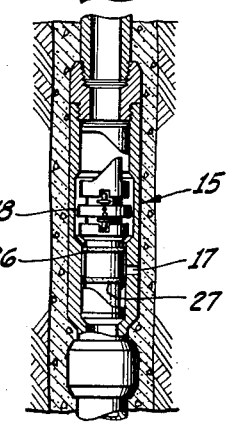
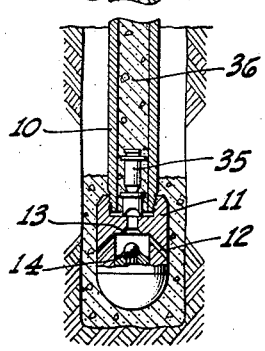
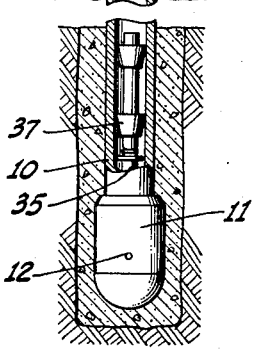
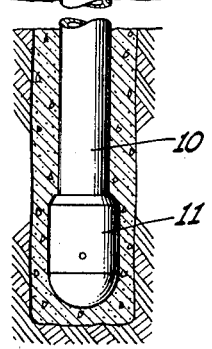
FIG. 1.   FIG. 2.   FIG. 3.
INVENTOR.
OTTO HAMMER
BY Hazard & Miller
ATTORNEYS.

Sept. 11, 1945.　　　　O. HAMMER　　　　2,384,675
APPARATUS FOR MULTIPLE STAGE CEMENTING
Filed Sept. 28, 1942　　　2 Sheets-Sheet 2

INVENTOR.
OTTO HAMMER
BY Hazard & Miller
ATTORNEYS.

Patented Sept. 11, 1945

2,384,675

UNITED STATES PATENT OFFICE 2,384,675

APPARATUS FOR MULTIPLE STAGE CEMENTING

Otto Hammer, Whittier, Calif., assignor to Security Engineering Co., Inc., Whittier, Calif., a corporation of California Application September 28, 1942, Serial No. 459,958

8 Claims. (Cl. 166—1)

This invention relates to an apparatus for multiple-stage cementing of wells, such as oil wells.

Heretofore, casings and the like have been cemented in oil wells by equipping the bottom of the casing with a cementing shoe. The casing is then landed and cement slurry is pumped down through the casing preceded and followed by cement plugs which prevent or retard the mixing of the slurry with the drilling fluid that is in the casing. The cement slurry is discharged through ports in the cementing shoe and flows up around the outside of the casing.

Usually it is inexpedient to attempt to discharge the slurry in a sufficient quantity to cement the casing for any substantial distance above the bottom of the casing. If this is attempted the discharged slurry tends to channel up through the drilling fluid in the well with the result that instead of bodily displacing the drilling fluid upwardly leaving a dense and relatively uncontaminated body of slurry around the casing, the slurry channels through the drilling fluid and becomes so contaminated therewith that an inadequate cement seal is formed.

When it is desired to cement a casing or the like in a well a substantial portion of its length or at spaced elevations stage cementing devices have been employed. These include couplings or fittings equipped with discharge ports that are located or incorporated in the casing at the levels where it is desired to discharge cement. A cementing string of pipe is then lowered into the casing which consecutively opens these discharge ports and cement slurry is pumped down the cementing string and caused to discharge through the discharge ports. Thereafter, the discharge ports may be closed against reverse flow.

An advantage of the first method, above described, is its speed of operation. Thus it is possible to introduce into the casing the cement plug that precedes the slurry, pump in the slurry, introduce the following cement plug, and pump the entire mass of cement down to the cementing shoe, very shortly after the casing has been landed. The objection to this method, however, is the inability to secure a dense homogeneous seal around the casing for any great distance above the cementing shoe. The objection to the second method above described is that considerable time must elapse between the landing of the casing and the start of the cementing operations in that the cementing string of pipe must be assembled and lowered into the casing after the casing has been landed before cementing operations may start. However, there is the corresponding advantage that the cement may be discharged at a plurality of different elevations consecutively so that a dense homogeneous cement seal can be secured at every locality where the slurry is discharged.

In some formations penetrated by oil wells it is highly desirable to have the bottom of the casing cemented as soon as possible after the casing has been landed but the formations penetrated are such that the casing must not only be adequately cemented near the casing shoe but it must also be adequately cemented at upper levels.

A primary object of the present invention is to provide a means and apparatus whereby the bottom of the casing can be speedily cemented and the casing can also be cemented at upper levels without danger of channeling which would be occasioned by attempting to discharge the slurry for the upper levels through the casing shoe.

More specifically, an object of the invention is to provide a method and apparatus for cementing casings and the like in wells wherein cement slurry may be pumped down the casing, preceded and followed by cement plugs, and the slurry discharged near the bottom of the casing so as to promptly cement the bottom of the casing in place, and to provide a means and apparatus whereby multiple stage cementing can be secured above the casing shoe to avoid channeling of the discharged cement through the drilling fluid, the construction being such that the discharge ports at upper levels can be opened and closed by the cementing string of pipe but the internal diameter through the casing from top to bottom is maintained uniform whereby the cement plugs used in the first cementing operation may readily pass through the stage cementing collars.

Another object of the invention is to provide an improved stage cementing collar having discharge ports, a rotatable sleeve therein which will consecutively open and close the ports on rotating the cementing string of pipe in the same direction. Thus, by rotating the cementing string toward the right the discharge ports may be opened and on continuing to rotate the cementing string toward the right the discharge ports may thereafter be closed. Reverse rotation of the cementing string of pipe which might tend to loosen its joints is thus eliminated.

Still another object of the invention is to provide a cementing collar which is of simple, durable, and relatively inexpensive construction.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through the bottom of an oil well illustrating the casing as equipped with the cementing collars embodying the present invention and illustrating the first cementing operation of the casing as being performed;

Fig. 2 is a view similar to Fig. 1 illustrating the first cementing operation as having been completed and the ports of the first cementing collar above the casing shoe as having been opened by the cementing string preparatory to conducting the first stage cementing operation;

Fig. 3 is a view similar to Fig. 1 illustrating the first stage cementing operation as having been completed and the second stage cementing operation as being about to be performed;

Figure 4:
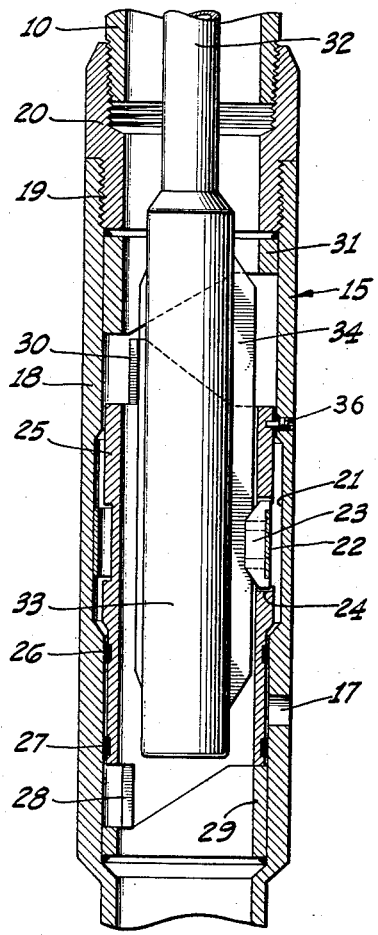
Fig. 4 is a vertical sectional view through a stage cementing collar embodying the present invention illustrating it as having been engaged by the splined nipple on the bottom of the cementing string of pipe. It may be regarded as a sectional view taken substantially upon the line 4—4 upon Fig. 6.
Figure 5:
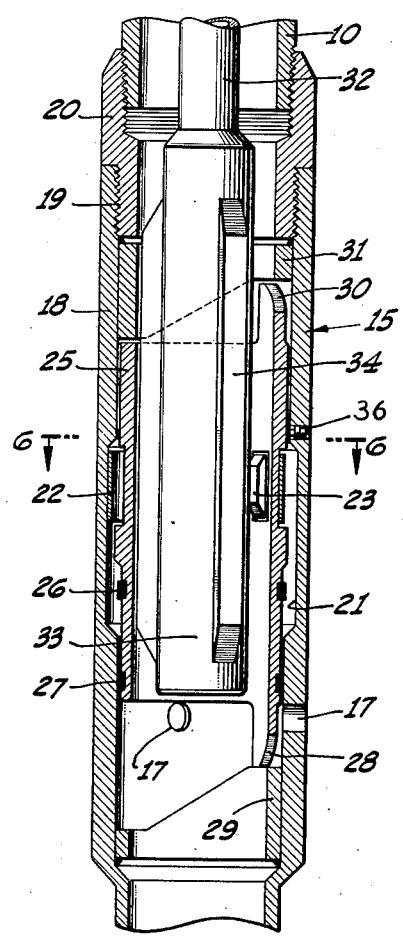
Fig. 5 is a view similar to Fig. 4 but illustrating the sleeve of the cementing collar as having been rotated by the cementing string into port-opening position.

Referring to the accompanying drawings wherein similar reference characters designate similar parts throughout, 10 indicates generally a casing, liner, or the like that it is desired to install in place in a well such as an oil well. This casing is made up of suitable pipe sections and collars and is equipped at its bottom with a cementing shoe 11 which may be of any preferred or conventional design. The cementing shoe illustrated has discharge ports 12 and a valve seat 13 for an upwardly closing valve 14. At the desired or required levels in the casing above the cementing shoe 11 there are incorporated in the casing the cementing collars 15 and 16 having discharge ports 17 and 17', respectively. Although the casing is herein illustrated as merely equipped with two cementing collars 15 and 16, it will be understood that the number and location of these cementing collars will vary greatly depending upon the number of places where it is desired to cement the casing and their elevations in the well.

Figure 7:
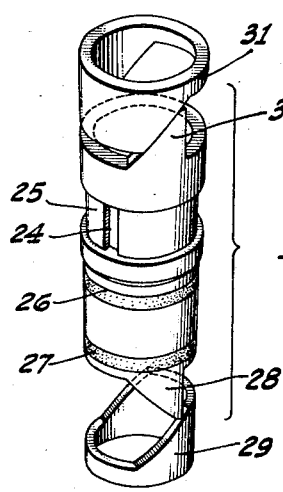
Fig. 7 is a perspective view illustrating the assembly of the sleeve of the cementing collar in assembly relationship with its cams.
Figure 6:
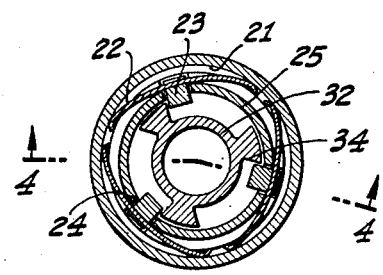
Fig. 6 is a horizontal section taken substantially upon the line 6—6 upon Fig. 5.

The details of each cementing collar are clearly illustrated in Figs. 4 to 7. Each cementing collar consists of an outer tubular section 18 equipped with threads 19 and a sub 20 to enable its being incorporated in the casing 10. The tubular section 18 has the discharge port 17 or 17' as the case may be, formed therein, there preferably being a plurality of these ports radially arranged. It has an internal annular recess as indicated at 21 to accommodate springs 22. On the inner faces of these springs there are secured dogs or lugs 23 that are urged by the springs inwardly through slots 24 in a rotary sleeve 25. This rotary sleeve is externally grooved to receive packing rings 26 and 27 normally disposed above and below the discharge ports 17. These packing rings may be of rubber, Neoprene, or the equivalent. The bottom of the rotary sleeve is cam-shaped as indicated in Fig. 7, there being a single tooth 28 on the cam which engages a cam member 29 welded or otherwise secured in the bottom of the outer tubular member 18. Similarly, the upper end of sleeve 25 is equipped with a complementary tooth 30 engageable with a cam member 31 that is welded or otherwise secured in the top of the outer tubular section 18. The upper cam 31 corresponds to the lower cam member 29, but is turned 180° therefrom, as clearly shown in Fig. 7. 32 indicates a cementing string of pipe that is assembled and lowered through the casing. This cementing string carries at its lower end a splined nipple 33 having vertical feathers or splines 34 formed thereon designed to receive the inwardly protruding portions of the dogs or lugs 23 therebetween. It will be noted from an inspection of Fig. 4 that the internal diameter of the rotary sleeve 25 and of the cam members 29 and 31 is substantially equal to that of the interior of the remainder of the casing. However the inwardly protruding portions of the dogs or lugs 23 normally project inwardly through slots into the interior of the sleeve. The dogs or lugs being slidingly positioned in slots 24 in sleeve 25 opposite annular recess 21 in section 18 may be moved radially outwardly of the sleeve until their inner ends lie substantially flush with the internal surface of the sleeve whereby the internal diameter of the casing is substantially uniform from top to bottom thereof.

Assuming that the casing has been assembled together with the stage cementing collars at the proper locations or elevations and it is desirable to cement the bottom of the casing as soon as possible after it is landed and to cement the casing at upper elevations without having the slurry channel through the drilling fluid, the casing is first landed as illustrated in Fig. 1. A lower or preceding cement plug 35 is introduced into the top of the casing and cement slurry 36 is pumped into the casing on top of the cementing plug. A following cementing plug 37 is then introduced into the casing and drilling fluid is pumped thereinto so as to force the body of cement slurry 36 downwardly through the casing both preceded and followed by the cement plugs to prevent contamination of the slurry with the drilling fluid. These operations can be conducted very quickly after the casing has been landed. When the slurry reaches the bottom, downward movement of the preceding cementing plug 35 is arrested at the cementing shoe. The slurry is then forced downwardly and caused to discharge through the ports 12 flowing up and around the casing as illustrated in Fig. 2. This continues until the upper cement plug 37 encounters the lower cement plug and has its movement arrested. Reverse flow of the slurry back into the casing is prevented by valve 14 seating on valve seat 13. In this manner the bottom of the casing can be quickly cemented in place very shortly after the casing has been landed.

As the cement plugs 35 and 37 descend in the casing they encounter the inwardly projecting dogs or lugs 23 which are urged inwardly by the spring 22. However, when these plugs encounter these dogs they merely force them outwardly through the sleeve 25 enabling the plugs to pass therethrough.

In order to cement the casing at the upper levels opposite the points where the cementing collars are located the cementing string 32 is then assembled equipped with its splined nipple 33. It is lowered into the casing until the splined nipple engages and enters the lowermost sleeve 25 of the lowermost cementing collar. On turning the cementing string 32 toward the right the splined nipple will be rotated until the dogs or lugs 23 are engaged by the sides of the grooves 34, thus forming a connection between the sleeve 25 and the splined nipple arresting continued relative rotation therebetween. When the pipe is then rotated the lower cam 28 on the bottom of the sleeve engages the lower cam member 29 and rotates relatively thereto, thus elevating the sleeve from the position shown in Fig. 4 to the position shown in Fig. 5, and opening the discharge ports 17. Cement slurry can then be forced down the cementing string 32 and discharged through these opened ports. It is caused to flow outwardly and upwardly around the lower cementing collar. When sufficient quantity of slurry has been discharged instead of reversely rotating the cementing string 32 which might tend to unscrew its joints, the cementing string is further rotated toward the right. This causes the single tooth at the bottom of the sleeve to descend from the high point on the lower cam member 29. The upper tooth 30 on the sleeve engages the upper cam member 31 thus forcing the sleeve downwardly during this continued rotation to again close the ports 17 and prevent reverse flow. Packing rings 26 and 27 prevent leakage.

When the lower cementing collar has been used to discharge cement around the casing the cementing string can then be elevated and caused to engage the dogs or lugs of the next upper cementing collar and on rotation, its ports 17 may be opened and cement slurry discharged therethrough. Thereafter the ports 17 may be closed by the sleeve to prevent reverse flow. This operation may be repeated on up the well for as many locations as there are installations of cementing collars.

From the above-described method and apparatus it will be appreciated that by the present invention it is possible to very quickly cement the bottom of the casing shortly after it has landed by using the conventional slurry preceded and followed by the cement plugs. However, instead of discharging any large amount of slurry through the cementing shoe 11 causing it to become contaminated with or channel through the drilling fluid, stage cementing operations can be subsequently conducted thereabove. The presence of the dog or lugs 23 required to open the ports of the cementing collars by the splined nipple on the cementing string 32 in no way interferes with the proper descent of the cementing plugs.

As a means for holding the rotary sleeves 25 in port closing position until such time as it is definitely desired to open them, shear pins or shear screws 36 may be employed. These shear pins or shear screws hold or lock the rotary sleeves 25 against rotation until they are definitely sheared off by rotation of the splined nipple 33.

The determination of whether the ports are open or closed can frequently be determined by observing the degree of revolution of the cementing string 32. Usually, however, this is determined by observing the pump pressure maintained by the pumps forcing the cement slurry down through the cementing string. This pump pressure will build up if the discharge ports are closed, and will fall when the discharge ports are open.

Various changes may be made in the details of construction without departing from the spirit and scope of the invention as described in the appended claims.

I claim:

1. A casing having outlet ports for the discharge of cement, a rotary sleeve in the casing, means on the sleeve normally projecting inwardly therein adapted to be operatively connected to a cementing string lowered into the casing so that the sleeve may be rotated thereby, said means being expansible outwardly until substantially flush with the inner wall of the sleeve so as to enable cement plugs to be forced therethrough, and cam means in the casing engageable by the sleeve to cause the sleeve to be raised and lowered during its rotation by the cementing string to open and close said ports.

2. A multiple stage cementing collar comprising an outer tubular section adapted to be incorporated in a casing or the like, said section having discharge ports therein, cams in the section above and below the discharge ports, a rotary sleeve in the section between the cams having ends shaped to cooperate with the cams to raise and lower the sleeve relative to said section upon rotation of the sleeve relative thereto to open and close said ports, and means for operatively connecting said sleeve to a cementing string of pipe lowered into the casing so as to be operable thereby.

3. A device of the class described comprising a ported body adapted to be incorporated in a string of casing, a sleeve therein, yieldable means on the sleeve normally projecting inwardly therefrom for establishing a connection with a cementing string of pipe lowered into the casing by which the sleeve may be moved to open and close the ports in the body, said means being capable of being forced outwardly to enable a cementing plug or the like to be forced through the sleeve.

4. A device of the class described comprising a ported body adapted to be incorporated in a string of casing, a sleeve therein, yieldable means on the sleeve normally projecting inwardly therefrom for establishing a connection with a cementing string of pipe lowered into the casing by which the sleeve may be moved to open and close the ports in the body, said means being capable of being forced outwardly so as to be substantially flush with the interior of the sleeve, to enable a cementing plug or the like to be forced through the sleeve.

5. A device of the class described comprising a ported body adapted to be incorporated in a string of casing, a sleeve rotatable therein to open and close the ports, yieldable means normally projecting inwardly from the sleeve to engage a cementing string of pipe lowered into the casing to enable the sleeve to be rotated thereby, said means being capable of being forced outwardly through the sleeve so as to be substantially flush with the interior of the sleeve to enable a cementing plug or the like to be forced therethrough.

6. A device of the class described comprising a body adapted to be incorporated in a string of casing, said body having an annular row of ports therein, a sleeve in the body adapted to be rotated therein, means in the casing for causing the sleeve to be raised and lowered during its rotation to open and close the ports respectively, and yieldable means normally projecting inwardly from the sleeve for establishing a connection with the cementing string of pipe lowered into the casing whereby the sleeve may be rotated thereby, said normally inward projecting means being capable of being forced outwardly in the sleeve to enable a cementing plug or the like to be forced therethrough.

7. A device of the class described comprising a body adapted to be incorporated in a string of casing, said body having an annular row of ports therein, a sleeve in the body adapted to be rotated therein, means in the casing for causing the sleeve to be raised and lowered during its rotation to open and close the ports respectively yieldable means normally projecting inwardly from the sleeve for establishing a connection with the cementing string of pipe lowered into the casing whereby the sleeve may be rotated thereby, said means being capable of being forced outwardly in the sleeve to enable a cementing plug or the like to be forced therethrough, and packing on the sleeve above and below the ports engageable with the body when the sleeve is in closing position.

8. A device of the class described comprising a body having an annular row of discharge ports therein, cams in the body above and below said ports, a sleeve within the body between the cams and engageable with the cams whereby upon rotation of the sleeve the sleeve will be raised or lowered to open or close the ports, dogs slidable through slots in the sleeve and normally projecting inwardly therefrom for engagement with the cementing string of pipe whereby upon rotation of the cementing string the sleeve may be rotated, spring means urging the dogs into their normal positions there being a space between the sleeve and the body into which the dogs may be forced to assume positions substantially flush with the interior of the sleeve on forcing a cementing plug or the like through the sleeve.

OTTO HAMMER.